US009832941B2

(12) United States Patent
Cheng et al.

(10) Patent No.: US 9,832,941 B2
(45) Date of Patent: Dec. 5, 2017

(54) HYDROPONIC CULTIVATION APPARATUS

(71) Applicant: Chunghwa Picture Tubes, Ltd., Taoyuan (TW)

(72) Inventors: Min-Chung Cheng, Taoyuan (TW); Mu-Hua Lin, Taoyuan (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 135 days.

(21) Appl. No.: 14/986,726

(22) Filed: Jan. 4, 2016

(65) Prior Publication Data

US 2017/0079223 A1  Mar. 23, 2017

(30) Foreign Application Priority Data

Sep. 21, 2015  (TW) .............................. 104215178 U (51) Int. Cl.
| | | |
|---|---|---|
| *A01G 31/00* | (2006.01) | |
| *A01G 31/02* | (2006.01) | |
| *A01G 7/04* | (2006.01) | |
| *A01G 9/20* | (2006.01) | |
| *F21V 23/02* | (2006.01) | |
| *A01G 31/06* | (2006.01) | |
| *F21Y 115/10* | (2016.01) | |

(52) U.S. Cl.
CPC ............. *A01G 31/02* (2013.01); *A01G 7/045* (2013.01); *A01G 9/20* (2013.01); *A01G 31/06* (2013.01); *F21V 23/02* (2013.01); *F21Y 2115/10* (2016.08); *Y02P 60/146* (2015.11); *Y02P 60/216* (2015.11)

(58) Field of Classification Search
CPC ...... A01G 27/02; A01G 27/04; A01G 27/003; A01G 27/005; A01G 27/008; A01G 7/045; A01G 9/20; Y02P 60/146; Y02P 60/216; F21V 23/02
USPC ....... 47/60, 61, 62 R, 62 N, 63, 46, 47, 48.5
See application file for complete search history.

(56) References Cited

U.S. PATENT DOCUMENTS

| | | | | |
|---|---|---|---|---|
| 2,884,740 A | * | 5/1959 | Hollander | ................ A01G 9/00 47/14 |
| 3,159,413 A | * | 12/1964 | Silverman | ............... F16L 41/02 285/189 |
| 3,250,606 A | * | 5/1966 | Murray | .................. A01G 31/00 47/62 N |
| 3,912,165 A | * | 10/1975 | Pira | ...................... A01G 25/023 137/10 |

(Continued)

FOREIGN PATENT DOCUMENTS

CA             2919917 A1 *  8/2016  ............. A01G 31/02

*Primary Examiner* — Peter M Poon
*Assistant Examiner* — Ebony Evans
(74) *Attorney, Agent, or Firm* — Winston Hsu (57) ABSTRACT

A hydroponic cultivation apparatus with detachable cultivation tray is provided in that each cultivation tray is magnetically mounted to an expansion socket of a main aqueduct so that a replaceable cultivation room may be independently provided. Each cultivation tray is equipped with a light source plate at the bottom. The light source plate is provided with power via a wireless receiver connected with a wireless transmitter at the socket. Multiple drain slots are aligning along a direction perpendicular to a horizontal level on each cultivation tray with some of them plugged with insulation pieces so that each cultivation tray may have the water level controlled independently.

8 Claims, 5 Drawing Sheets

(56) References Cited

U.S. PATENT DOCUMENTS

| | | | | | |
|---|---|---|---|---|---|
| 4,310,990 | A | * | 1/1982 | Payne | A01G 31/02 47/59 R |
| 4,334,386 | A | * | 6/1982 | Burcombe | A01G 31/02 47/62 E |
| 4,546,571 | A | * | 10/1985 | Scrivens | A01G 27/04 47/64 |
| 4,887,388 | A | * | 12/1989 | Waltel, Jr. | A01G 27/00 47/48.5 |
| 4,932,158 | A | * | 6/1990 | Roberts | A01G 31/047 47/64 |
| 5,097,627 | A | * | 3/1992 | Roberts | A01G 31/045 47/62 R |
| 6,360,483 | B1 | * | 3/2002 | Sherfield | A01G 31/02 47/62 R |
| 7,069,691 | B2 | * | 7/2006 | Brooke | A01G 9/028 47/59 R |
| 7,877,927 | B2 | * | 2/2011 | Roy | A01G 31/02 47/62 A |
| 2006/0032136 | A1 | * | 2/2006 | Chou | A01G 27/003 47/80 |
| 2015/0351329 | A1 | * | 12/2015 | Heidl | A01G 9/023 211/49.1 |
| 2016/0066524 | A1 | * | 3/2016 | Williams | A01G 31/06 47/62 R |

* cited by examiner

HYDROPONIC CULTIVATION APPARATUS

BACKGROUND OF THE INVENTION

1. Field of the Invention

The invention relates to a hydroponic cultivation apparatus, and more particularly, to a hydroponic cultivation apparatus with detachable cultivation trays.

2. Description of the Prior Art

Currently, a hydroponic cultivation apparatus or a plant factory uses planar aqueducts, each separately mounted on a frame and stacked with one another for massive planting. A number of holed cultivation plates are placed on the aqueducts, while plants are placed in each hole one by one. Since the plants share common room in one aqueduct, each aqueduct is designed to have same and fixed area.

Such type of hydroponic cultivation apparatus, however, has at least the following drawbacks:

1. Since all the plants grow in the same aqueduct and share the same cultivation room, i.e., each aqueduct has one same water level, and due to the need of different depth of nutrient solution by each kind of plant, a conventional aqueduct should often provide excessive nutrient solution therein for all the plants and unnecessary waste of nutrient solution is always inevitable.
2. Limited by the size of the aqueduct itself, not so many different kinds of plants that are of different sizes can be flexibly planted in such an aqueduct with unified size and design. Limitation of usage of the space certainly leads to limitation of productivity.
3. Light board or light source of the same size and area as the whole area of each aqueduct is required when it comes to illuminating the plants as a sufficient coverage of each aqueduct. It is obvious an increase of cost of illumination construction and unnecessary power waste.

SUMMARY OF THE INVENTION

Hence, the invention provides a highly flexible hydroponic cultivation apparatus as a solution to improve what has happened as limitations when it comes to conventional cultivation apparatus.

An aspect of the invention provides a hydroponic cultivation apparatus including a main aqueduct and a plurality of cultivation trays. The main aqueduct includes a plurality of expansion sockets, a supply line, and a discharge section. The supply line includes a plurality of supply sections, each supply section aligning with one of the expansion sockets respectively. Each cultivation tray is detachably mounted to one of the expansion sockets of the main aqueduct and each cultivation tray provides a cultivation room for a plant. Nutrient solution is provided from the plurality of supply sections to the cultivation rooms of the plurality of cultivation trays and discharged by the discharge section.

According to the embodiment of the invention, an indented structure is formed around each expansion socket of the main aqueduct, each cultivation tray includes a protruding portion corresponding to the expansion socket, and the protruding portion includes a connecting wall at both sides of the protruding portion respectively. The protruding portion of the cultivation tray extends toward the expansion socket and the connecting walls at both sides of the protruding portion abut against the indented structure.

According to the embodiment of the invention, the indented structure includes a plurality of through holes, the main aqueduct further includes a plurality of ferromagnetic posts, and the connecting walls at both sides of the protruding portion includes a plurality of magnetic elements corresponding to the plurality of through holes. When the cultivation tray is mounted to the expansion socket and the connecting walls of the protruding portion abut against the indented structure, the plurality of ferromagnetic posts passing through the plurality of through holes are in magnetic attraction with the magnetic elements and the cultivation tray is fixed to the expansion socket.

According to the embodiment of the invention, the protruding portion includes an inlet hole and the supply section passes through the inlet hole and provides nutrient solution for the cultivation room.

According to the embodiment of the invention, the protruding portion further includes a water level control structure including a plurality of drain slots and a plurality of insulation pieces. The plurality of drain slots align along a direction perpendicular to a horizontal level. The plurality of insulation pieces selectively plug into one or multiple drain slots.

According to the embodiment of the invention, the horizontal level of each drain slot is higher than the horizontal level of the inlet hole.

According to the embodiment of the invention, each cultivation tray includes a light source plate at the bottom. the light source plate is connected to a wireless receiver and each expansion socket includes a wireless transmitter. When the cultivation tray is mounted to the expansion socket, the wireless transmitter provides charging signal to the wireless receiver to power the light source plate.

According to the embodiment of the invention, the light source plate is a light emitting diode (LED) light source plate.

According to the embodiment of the invention, an indented structure is formed around each expansion socket and each cultivation tray includes a protruding portion corresponding to the expansion socket. The wireless receiver is disposed on the protruding portion and the wireless transmitter is disposed on the indented structure at a position aligning with the wireless receiver.

The hydroponic cultivation apparatus according to the invention provides high space usage, and increasing productivity of the plants. Each independent cultivation tray may provide different water level control, not only saving the usage of nutrient solution but adaptive for planting fruit. The independent light source plate attached to each cultivation tray also cuts down on the cost of illumination construction and reduces unnecessary power waste.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. Also, the term "couple" is intended to mean either an indirect or direct electrical/mechanical connection. Thus, if a first device is coupled to a second device, that connection may be through a direct electrical/mechanical connection, or through an indirect electrical/mechanical connection via other devices and connections.

Figure 1:
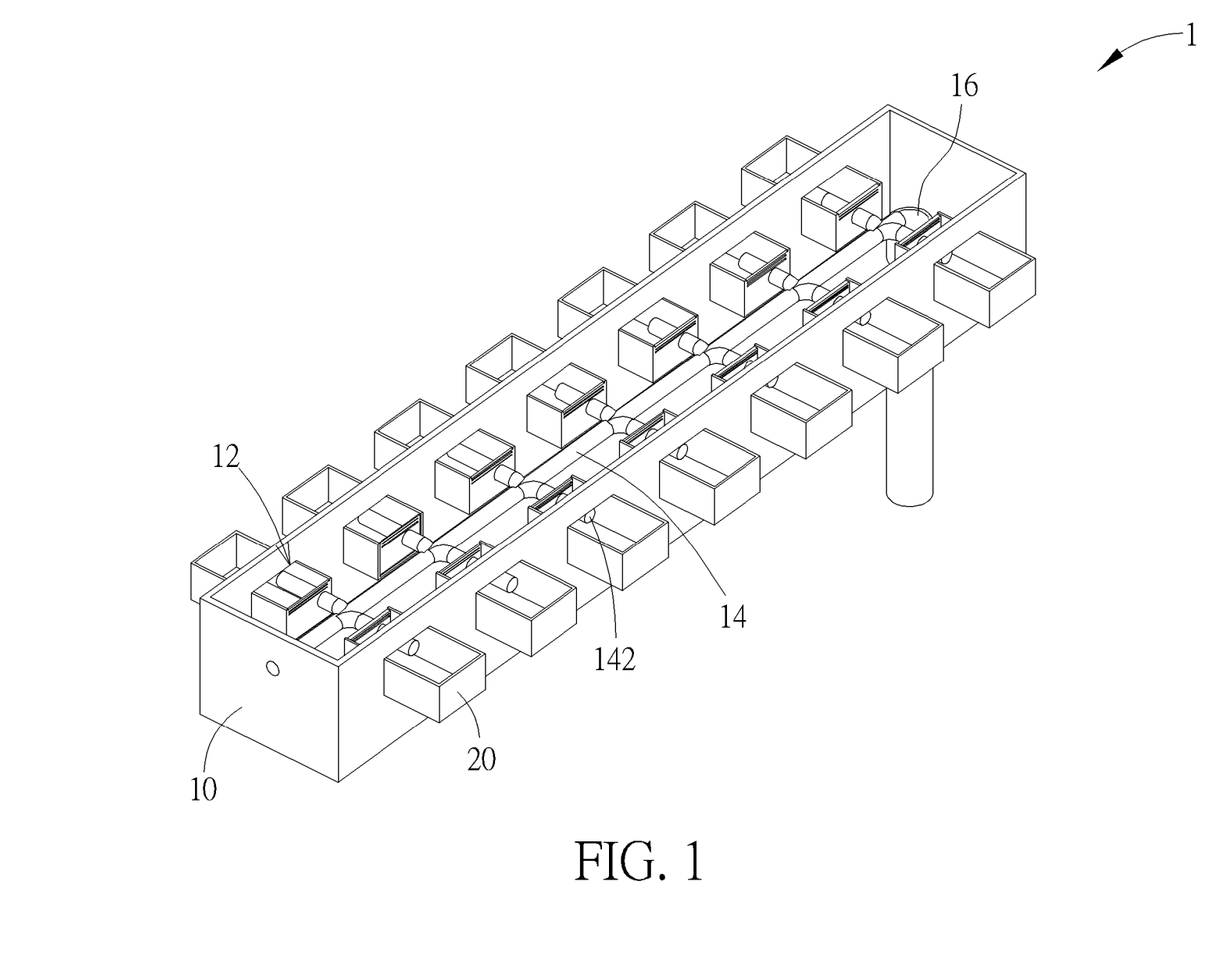
FIG. 1 is an illustration of a first embodiment of a hydroponic cultivation apparatus according to the invention.

Please refer to FIG. 1. FIG. 1 is an illustration of a first embodiment of a hydroponic cultivation apparatus according to the invention. The hydroponic cultivation apparatus 1 includes a main aqueduct 10 and a plurality of replaceable cultivation trays 20. The main aqueduct 10 includes a plurality of expansion sockets 12 aligning in two rows at both sides of the main aqueduct 10. The plurality of cultivation trays 20 are, respectively, mounted to these expansion sockets 12 in a detachable way. The main aqueduct 10 has a supply line 14 that has a plurality of supply sections 142, each aligning with one of the expansion sockets 12 respectively. Therefore, each replaceable cultivation tray 20 is supplied with a supply section 142 and provides a cultivation room 22, referring to FIG. 4, for a plant. The nutrient solution needed by the plant is supplied by the supply section 142, flowing into the cultivation room 22 of the cultivation tray 20 and reflowing back to the main aqueduct 10 from the cultivation tray 20, discharged by a discharge section 16 of the main aqueduct 10. Each plant may be well cultivated in an individual cultivation tray and with such separate structure of main aqueduct and cultivation trays, a more than 1.25 times of cultivation area may be provided compared to the area of the structure that plants are cultivated only in the main aqueduct.

Figure 2:
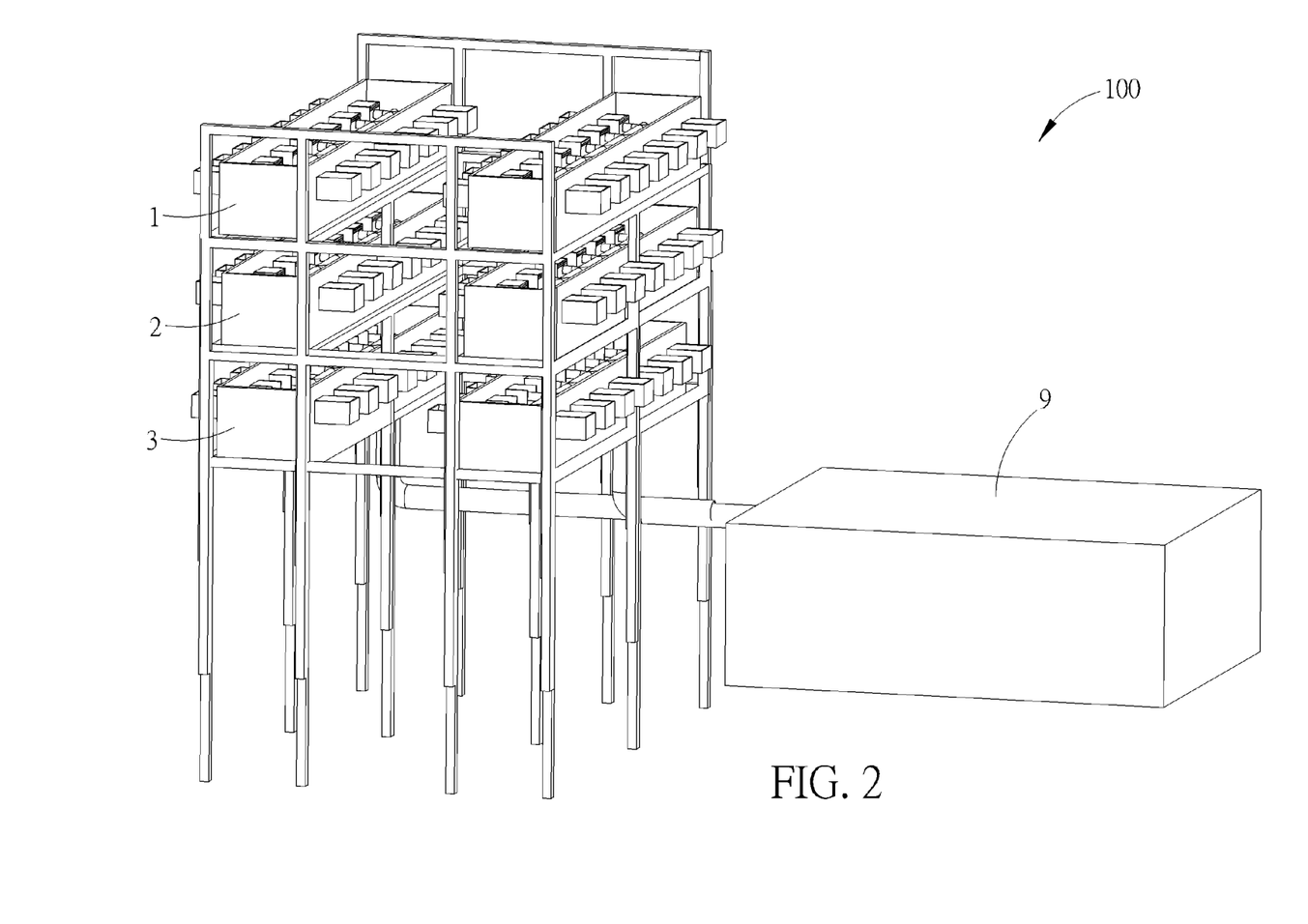
FIG. 2 is an illustration showing a hydroponic cultivation system formed by stacks of multiple hydroponic cultivation apparatuses according to the invention.

Please refer to FIG. 2. FIG. 2 is an illustration showing a hydroponic cultivation system formed by stacks of multiple hydroponic cultivation apparatuses according to the invention. A hydroponic cultivation system 100 is built by mounting and stacking a plurality of hydroponic cultivation apparatuses on a shell and connecting the supply line and discharge section of each main aqueduct as a system. Each main aqueduct is connected to a nutrient solution tank 9 via the discharge section and the nutrient solution tank 9 is also connected to the supply line to provide the nutrient solution for the hydroponic cultivation apparatuses 1, 2, 3 for circulation of the nutrient solution.

Figure 3:
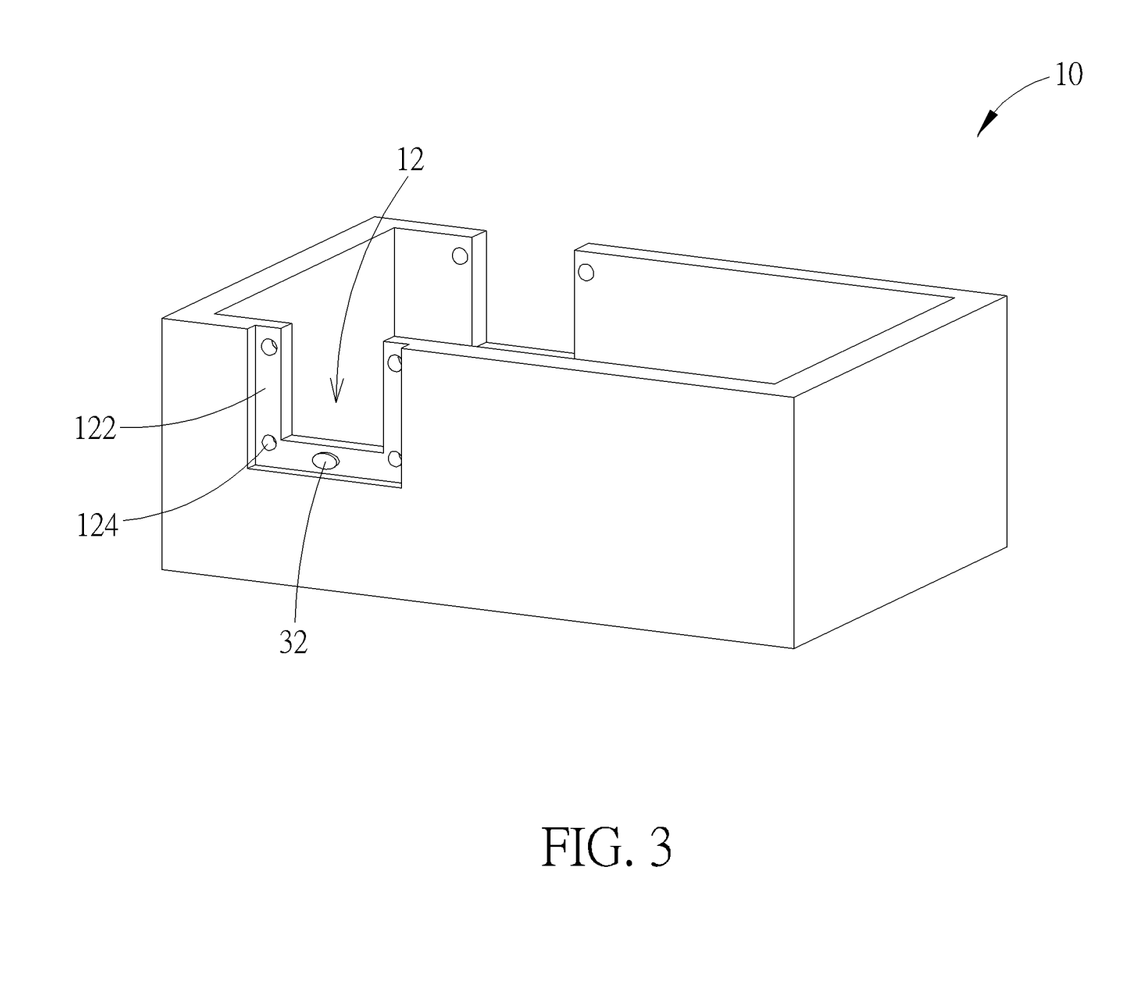
FIG. 3 is an illustration showing an embodiment's partial view of the main aqueduct of the hydroponic cultivation apparatus.
Figure 4:
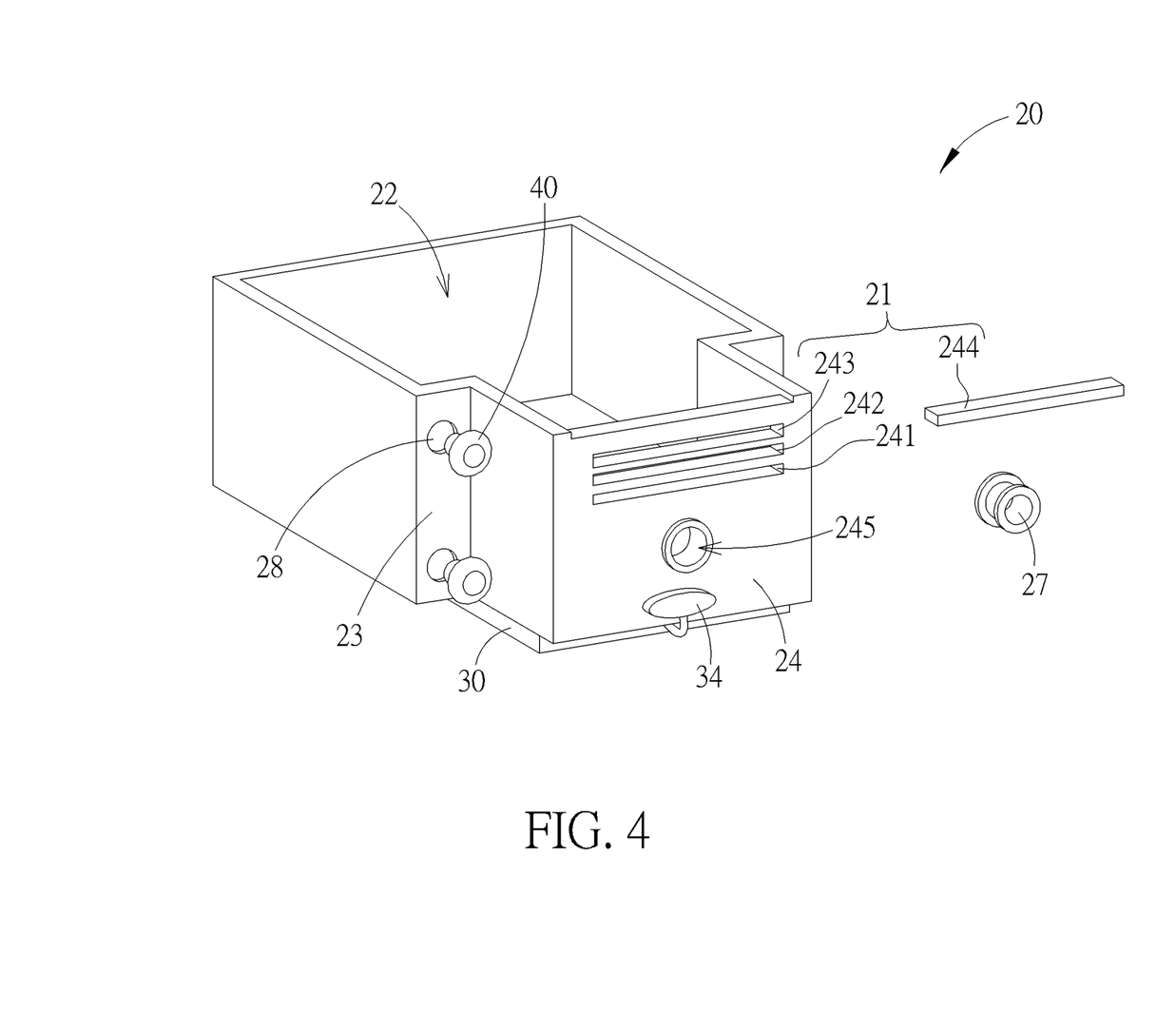
FIG. 4 is an illustration of a first embodiment of the cultivation tray of the hydroponic cultivation apparatus.
Figure 5:
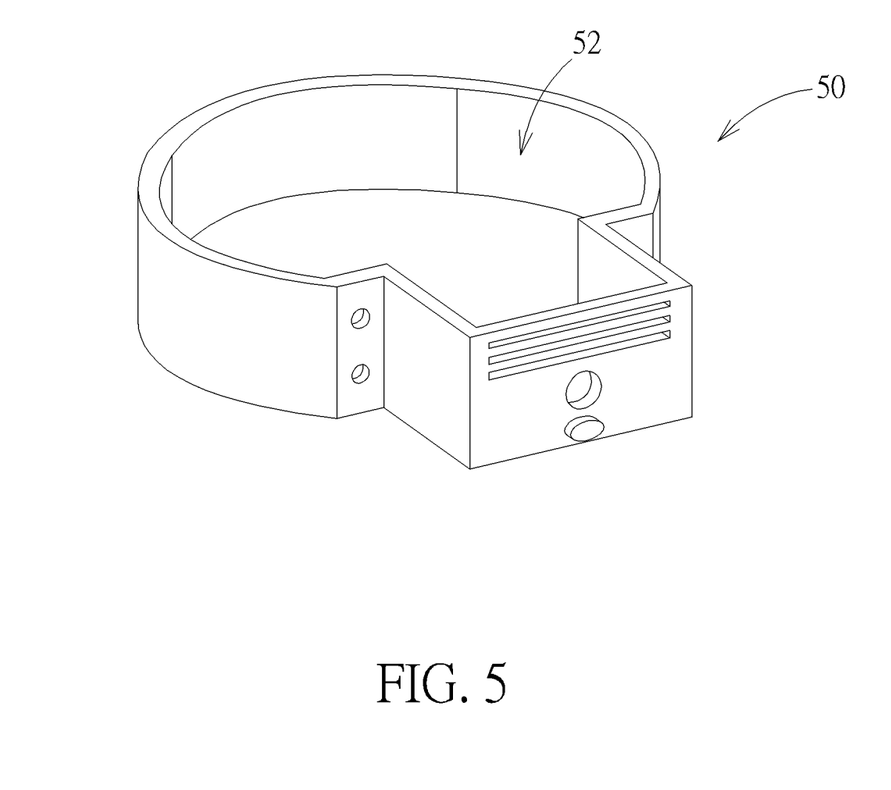
FIG. 5 is an illustration of a second embodiment of the cultivation tray of the hydroponic cultivation apparatus.

Please refer to FIG. 3. FIG. 3 is an illustration showing an embodiment's partial view of the main aqueduct of the hydroponic cultivation apparatus. In one embodiment, an indented structure 122 is formed around each expansion socket 12 of the main aqueduct 10. Each indented structure 122 includes a plurality of through holes 124, which are four in this embodiment but not limited by the embodiment. Please refer to FIG. 4 and FIG. 5. FIG. 4 is an illustration of a first embodiment of the cultivation tray of the hydroponic cultivation apparatus and FIG. 5 is an illustration of a second embodiment of the cultivation tray of the hydroponic cultivation apparatus. As previously mentioned, each replaceable cultivation tray 20 has a cultivation room 22. Each cultivation tray 20 also has a protruding portion 24 to be positioned corresponding to the expansion socket 12 of the main aqueduct 10, the size and shape of the protruding portion 24 matching the expansion socket 12 so that any cultivation tray 20 can be arbitrarily mounted to any one of the expansion socket 12 according to the need of cultivation, the kind and number of plant to be cultivated, etc. With the unified specification of the protruding portion 24 in cooperation with the expansion socket 12, the cultivation tray may also be made with any possible shape without limitation. For example, the second embodiment of the cultivation tray 50 in FIG. 5 provides a cultivation room 52 with circular shape while different shape, size of cultivation room can be provided in the cultivation room according to what a plant to be placed therein will need in other embodiments.

The cultivation tray 20 of the invention is mounted to the expansion socket 12 of the main aqueduct 10 in a magnetic attractive way. The protruding portion 24 includes a connecting wall 23 at both sides of the protruding portion 24 respectively (due to the angle of view, FIG. 4 shows only the connecting wall 23 at one side). As the protruding portion 24 of the cultivation tray 20 extends toward one expansion socket 12, the connecting walls 23 at both sides of the protruding portion 24 abut against the indented structure 122, which has a plurality of through holes 124 as mentioned earlier. A plurality of ferromagnetic posts 40 of the main aqueduct 10 pass through the through holes 124 and are positioned next to a plurality of magnetic elements 28, which correspond to the plurality of through holes 124, at the connecting walls 23. The ferromagnetic posts 40 in this embodiment have a shape of a bolt with the thicker end positioned at an inner side of the main aqueduct 10. With the magnetic attraction between the ferromagnetic posts 40 and the magnetic elements 28, preferably magnets, the cultivation tray 20 can be fixed to the expansion socket 12, enhancing the connectivity between the cultivation tray 20 and the main aqueduct 10 for supporting heavier plants. The way how the cultivation tray 20 is mounted to the main aqueduct 10 makes each cultivation tray 20 easily detachable so that each cultivation tray 20 can be individually replaced or cleaned.

Additionally, the protruding portion 24 includes an inlet hole 245 for the supply section 142 of the supply line 14 passing through to provide nutrient solution for the cultivation room 22 when each cultivation tray 20 is mounted to the main aqueduct 10. In a preferred embodiment, a silicon ring 27 with good seal can be further disposed at the inlet hole 245 for tightly sealing between the supply section 142, a water pipe for example, and the inlet hole 245, preventing the nutrient solution from leaking out of the inlet hole 245.

Please go on referring to FIG. 4. Since different plants require different depth of nutrient solution, each cultivation tray 20 includes a water level control structure 21 at the protruding portion 24 for respectively controlling the water level of each cultivation tray 20. The water level control structure 21 includes a plurality of drain slots 241, 242, 243 and a plurality of insulation pieces 244. The drain slots 241, 242, 243 are disposed at the protruding portion 24 aligning along a direction perpendicular to a horizontal level and hence, each drain slot 241, 242, 243 has its own level different from one another. In the embodiment in FIG. 4 for example, the drain slots 241, 242, 243 maybe horizontally extending slit-type openings, but not limited to, and the drain slot 241 is located at a lowest position, followed by the drain slot 242, and the drain slot 243 is located at a highest position. Additionally, the horizontal level of each drain slot 241, 242, 243 is higher than the horizontal level of the inlet hole 245.

One or more insulation pieces 244, in the form that is cooperating with the shape of the drain slots 241, 242, 243 (which is long strip shape in this embodiment) and is preferably made of silicon gel, can be selectively plugged into one or multiple drain slots 241, 242, 243 for water level adjustment. For example, the drain slots 242, 243 (or none of any drain slots 241, 242, 243) can be plugged with the insulation pieces 244 to set the water level at the lowest height such that the nutrient solution flows back to the main aqueduct 10 when it fills the cultivation room 22 up to the height of the drain slot 241. The drain slots 241, 243 or simply the drain slot 241 can be plugged with the insulation pieces 244 to set the water level at the height of where the drain slot 242 is located such that the nutrient solution flows back to the main aqueduct 10 when it fills the cultivation room 22 up to the height of the drain slot 242. When the drain slots 241, 242 are plugged with the insulation pieces 244 to set the water level at the highest height, where the drain slot 243 is located, the nutrient solution will not flow back to the main aqueduct 10 until it fills the cultivation room 22 up to the height of the drain slot 243.

Please refer to FIG. 3 and FIG. 4. The hydroponic cultivation apparatus according to the invention further provide flexible illuminating solution therewith. A light source plate 30, preferably a light emitting diode (LED) light source plate, may be further disposed at the bottom side of each cultivation tray 20 and a wireless transmitter 32 is disposed on the indented structure 122 of each expansion socket 12 of the main aqueduct 10, whereas a wireless receiver 34 is also embedded into each cultivation tray 20. The wireless receiver 34 is connected to the light source plate 30 and disposed at the protruding portion 24. The wireless transmitter 32 is disposed on the indented structure 122 at a position aligning with the wireless receiver 34. When any one cultivation tray 20 is mounted to one of the expansion sockets 12, the wireless transmitter 32 is made connectable with the wireless receiver 34 on the cultivation tray 20, providing charging signal wirelessly to the wireless receiver 34 so as to power the light source plate 30.

Through the light source plate 30 of each independent cultivation tray 20, a wireless charging solution may be accomplished without extra wiring program. When a cultivation tray 20 is mounted to the main aqueduct 10, the light source plate 30 at the bottom side of the cultivation tray 20 is able to provide necessary light for the plant beneath this cultivation tray 20. For example, in the hydroponic cultivation system 100 in FIG. 2, the plants in the hydroponic cultivation apparatus 2 may be illuminated by the corresponding cultivation trays 20 of the hydroponic cultivation apparatus 1 above, and the plants in the hydroponic cultivation apparatus 3 may be illuminated by the corresponding cultivation trays 20 of the hydroponic cultivation apparatus 2 above.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hydroponic cultivation apparatus, comprising:
a main aqueduct comprising a plurality of expansion sockets, a supply line, and a discharge section, the supply line comprising a plurality of supply sections, each supply section aligning with one of the expansion sockets respectively; and
a plurality of cultivation trays, each cultivation tray detachably mounted to one of the expansion sockets of the main aqueduct, each cultivation tray providing a cultivation room for a plant;
wherein for each cultivation tray, nutrient solution is provided from the supply section aligned with the corresponding expansion socket to the cultivation room of the cultivation tray, reflowing back from the same expansion socket to the main aqueduct, and discharged by the discharge section;
wherein an indented structure is formed around each expansion socket of the main aqueduct, each cultivation tray comprising a protruding portion corresponding to the expansion socket, the protruding portion comprising a connecting wall at both sides of the protruding portion respectively, the protruding portion of the cultivation tray extending toward the expansion socket and the connecting walls at both sides of the protruding portion abutting against the indented structure.

2. The hydroponic cultivation apparatus of claim 1, wherein the indented structure comprises a plurality of through holes, the main aqueduct further comprises a plurality of ferromagnetic posts, each of the ferromagnetic posts passing through a respective through hole and having a shape of a bolt with a thicker end positioned at an inner side of the main aqueduct, and the connecting walls at both sides of the protruding portion comprising a plurality of magnetic elements corresponding to the plurality of through holes; when the cultivation tray is mounted to the expansion socket and the connecting walls of the protruding portion abut against the indented structure, the plurality of ferromagnetic posts are in magnetic attraction with the magnetic elements and the cultivation tray is fixed to the expansion socket.

3. The hydroponic cultivation apparatus of claim 1, wherein the protruding portion comprises an inlet hole, the supply section passing through the inlet hole and providing nutrient solution for the cultivation room.

4. The hydroponic cultivation apparatus of claim 3, wherein the protruding portion further comprises a water level control structure, comprising:
a plurality of drain slots, aligning along a direction perpendicular to a horizontal level; and
a plurality of insulation pieces selectively plugging into one or multiple drain slots, each of the plurality of insulation pieces corresponding to a respective drain slot.

5. The hydroponic cultivation apparatus of claim 4, wherein the horizontal level of each drain slot is higher than a horizontal level of the inlet hole.

6. The hydroponic cultivation apparatus of claim 1, wherein each cultivation tray comprises a light source plate, the light source plate is connected to a wireless receiver, and each expansion socket comprises a wireless transmitter; when the cultivation tray is mounted to the expansion socket, the wireless transmitter provides charging signal to the wireless receiver to power the light source plate.

7. The hydroponic cultivation apparatus of claim 6, wherein the light source plate is a light emitting diode (LED) light source plate.

8. The hydroponic cultivation apparatus of claim 6, wherein an indented structure is formed around each expansion socket and each cultivation tray comprises a protruding portion corresponding to the expansion socket, and wherein the wireless receiver is disposed on the protruding portion and the wireless transmitter is disposed on the indented structure at a position aligning with the wireless receiver.

\* \* \* \* \*